Patented Dec. 20, 1949

2,491,532

UNITED STATES PATENT OFFICE 2,491,532

2-MERCAPTOPYRIMIDINES AND METHOD OF PREPARING SAME

Frank Swedish, Jr., Rothschild, Wis., assignor to The B. F. Goodrich Company, New York, N. Y., a corporation of New York No Drawing. Application August 7, 1946, Serial No. 688,961

10 Claims. (Cl. 260—251)

This invention relates to 2-mercaptopyrimidines and pertains particularly to an improved method of preparing such compounds.

I have discovered that 2-mercapto-dihydropyrimidines may be prepared by the reaction of a ketone having a hydrogen atom in alpha position and a thiocyano group in beta position to the keto group, and being otherwise composed exclusively of carbon and hydrogen atoms (such ketones being hereinafter referred to as beta-thiocyano-ketones), with ammonia or a primary amine. Water is split out during the reaction, ring closure occurs, and the mercapto-pyrimidine product is easily obtained in excellent yield.

The reaction may be represented by the following generic equation:

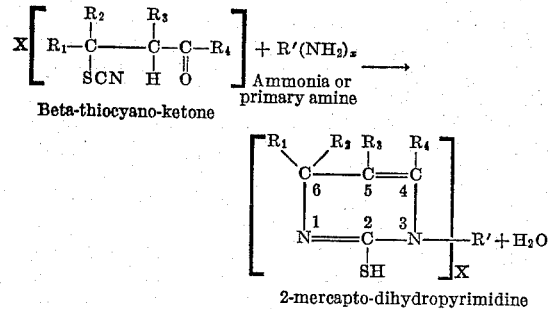

2-mercapto-dihydropyrimidine wherein $R_1$, $R_2$ and $R_3$ are hydrogen or hydrocarbon radicals, $R_4$ is a hydrocarbon radical, $R'$ is hydrogen or a radical derived by removing $-NH_2$ from a primary amine and $X$ is an integer whose value is equal to the number of $-NH_2$ groups in the compound reacted with the thiocyano ketone (the value of $x$ will of course be 1 when ammonia or a primary monoamine is used and will be more than one when a polyamine containing more than one $NH_2$ group is used).

Any desired beta-thiocyano-ketone having a formula as represented in the above equation may be used in this invention. Thus, any or all of $R_1$, $R_2$ and $R_3$ may be hydrogen or any hydrocarbon radical including alkyl, alkenyl, cycloalkyl, aryl, aralkyl and alkaryl radicals as well as other radicals composed of carbon and hydrogen. Similarly, $R_4$ may be any of the above-mentioned hydrocarbon radicals. Beta-thiocyano-ketones of this type may be prepared by the reaction of an unsaturated ketone having an olefinic double bond in alpha-beta position to the keto group, with nascent thiocyanic acid formed by the interaction of a non-oxidizing mineral acid, such as dilute sulfuric or hydrochloric acid, with ammonium thiocyanate or an alkali metal thiocyanate. The preferred beta-thiocyano-ketones for use in this invention are those which are aliphatic and saturated in nature and contain from 4 to 12 carbon atoms, such compounds being prepared by the addition of thiocyanic acid to the double bond of such alpha-beta unsaturated aliphatic ketones as mesityl oxide, phorone, butylidene acetone, heptylidene acetone, 5-methyl-4-heptene-one-3, 5-ethyl-3-heptene-one-2, 5-ethyl-3-nonene-one-2, 3-methyl-4-ethyl-3-hexene-one-2, vinyl methyl ketone, vinyl ethyl ketone and the like. A typical beta-thiocyano-ketone is 4-methyl 4-thiocyanopentan-2-one prepared from thiocyanic acid and mesityl oxide.

The material to be reacted with the beta-thiocyano-ketone according to this invention may be ammonia or any of the various primary amines. Suitable primary amines include primary alkyl monoamines such as methylamine, ethylamine, propylamine, isopropylamine, n-butylamine, beta-(dimethyl)-butylamine, beta-ethyl butylamine, isobutylamine, amylamine, isoamylamine and hexylamines; primary aromatic monoamines such as aniline, toluidines (ortho, meta and para), xylidines (2,3-, 2,4-, 2,5-, 2,6-, 3,4-, and 3,5-), xenylamine, p-ethyl aniline, naphthylamines and the like; primary aralkyl monoamines such as benzylamine, alpha-methyl benzylamine, benzhydrylamine and the like; and such alicyclic primary monoamines as cyclohexylamine. Amines containing more than one $-NH_2$ group may also be used, in which event a molecule of the beta-thiocyano-ketone reacts with each $-NH_2$ group, as indicated in the generic equation hereinabove. Examples of such primary polyamines include ethylene diamine, propylene diamine, o-, m- and p-phenylene-diamines, naphthylene diamines, diamino-cyclohexane, diamino diphenyl and the like. Primary amines containing only carbon, hydrogen and nitrogen atoms, the nitrogen being present in the $-NH_2$ grouping, are preferred, but other atoms such as those of oxygen, sulfur and halogen may also be present in the primary amines used. For example, ethanolamine, thioethanolamine, furfuryl amine, chloroanilines and similar primary amines containing oxygen, sulfur or halogen may be employed.

In carrying out the reaction, the reactants are brought together in any desired manner, preferably by agitating the reactants in the presence of an inert solvent or diluent such as water, ether, benzene, hexane or other inert liquids, and preferably also in the presence of a mineral acid, which catalyzes the ring closure. The temperature and pressure at which the reaction is effected are not critical and may be varied widely. When the reaction is conducted in aqueous medium, as is preferred, the use of temperatures of 0 to 100° C. and atmospheric pressure are of course most convenient. It is also sometimes desirable, but not essential, to employ a wetting agent such as a soap or an alkali sulfonate or the like when conducting the reaction in aqueous medium since the product is then obtained in readily dispersable form. The amount of the reactants employed is ordinarily about that which is theoretically required for the reaction, that is, one molecular equivalent of beta-thiocyano-ketone for each molecular equivalent of —NH₂ in the ammonia or amine, but use of an excess of either of the reactants is also possible and is contemplated.

The 2-mercapto-dihydropyrimidines obtained by the reaction are quite useful organic compounds. Compounds of this type in which hydrogen or a phenyl group is attached to the nitrogen in the 3-position are known compounds and are useful accelerators for the vulcanization of rubber as is disclosed in U. S. Patent 2,234,848 to William P ter Horst. Other 2-mercapto-dihydropyrimidines obtained in this invention are new compounds and are also useful for this purpose as well as for other purposes such as in the preparation of medicinals, pharmaceuticals and pesticides. Those in which a saturated hydrocarbon radical such as an alkyl or cycloalkyl radical is attached to the nitrogen in the 3-position are of especial utility, and have been found to possess the unusual property of melting at a considerably lower temperature than analogous compounds having hydrogen on the nitrogen in the 3-position.

The following specific examples are illustrative of my invention but the invention is by no means limited thereto. The parts are by weight.

Example I

To 75.5 parts of 4-methyl-4-thiocyanopentan-2-one, a red oily liquid, is added 50 parts of water with stirring. To the stirred suspension, there is then slowly added 49 parts of a 66% by weight solution of isopropylamine in water. After allowing the reaction mixture to stir for about 50 minutes at about 50° C. after the addition of the amine is completed, the stirring is stopped and an oily layer settles out which is separated from the water layer. The oily product is purified by washing with water and ether whereupon 65 parts (68% yield) of a reddish-brown oil, are obtained. The oil crystallizes in about 36 hours to form a mush of crystals, which indicates that the product when a solid has a melting point only slightly above room temperature. The product is identified as 2-mercapto-3-isopropyl-4,6,6-trimethyl-dihydropyrimidine, obtained by the following reaction equation:

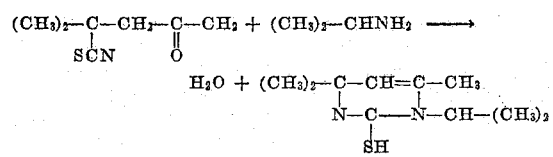

In a similar manner other 2-mercapto-3-alkyl-4,6,6-dihydropyrimidines, which are low melting solids, are secured when other alkylamines are used in place of isopropylamine.

Example II

To prepare 2-mercapto-3-cyclohexyl-4,6,6-trimethyl-dihydropyrmidine, 49.5 parts of cyclohexylamine are added to a stirred mixture of 78.5 parts of 4-methyl-4-thiocyanopentan-2-one, 50 parts of water and 3 parts of sulfuric acid over a period of 17 minutes. The temperature of the reaction mixture rises from 26° C. to about 75° C. during the addition of the amine after which the reaction mixture is heated to 85° C. for a short time and then cooled. The product is extracted from the reaction medium with ether and recovered in a crystalline form by evaporating the ether. The crystalline solid, 2-mercapto-3-cyclohexyl-4,6,6-trimethyl-dihydropyrimidine, is substantially free from impurities, and melts at 157–158° C.

Example III

To prepare 2-mercapto-3-alpha-naphthyl-4,6,6-trimethyl-dihydropyrimidine, 71.5 parts of alpha-naphthylamine are slowly added to a stirred mixture of 78.5 parts of 4-methyl-4-thiocyanopentan-2-one and 50 ml. of water over a period of 30 minutes at a temperature of about room temperature to 50° C. The product forms quite readily and settles out when the stirring is stopped. The product is recovered by filtration, washed with water and dried at 100–120° C. 118 parts (83% yield) of 2-mercapto-3-alpha-naphthyl-4,6,6-trimethyl-dihydropyrimidine, M. P. 203–205° C., are thus obtained.

It is not essential that the beta-thiocyano-ketone be prepared separately to be able to practice my invention, for an alpha-beta unsaturated ketone of the class hereinabove described, a salt of thiocyanic acid and an acid, can be combined and allowed to react first to form the beta-thiocyano-ketone; then the amine added to the reaction mixture to cause the pyrimidine to be formed. Examples IV and V wherein the 4-methyl-4-thiocyanopentan-2-one to be reacted with the amine is prepared from the reaction of mesityl oxide, an acid and a thiocyanate, illustrate this procedure, which would be the one usually employed in large scale production.

Example IV

To 196 parts of mesityl oxide in a 2 liter-3 neck flask, there is slowly added over a 15 minute period a solution of sulfuric acid prepared by mixing 218 parts of 95.5% H₂SO₄ and 206 parts of crushed ice with stirring. The reaction temperature is maintained at about 10° C. by external cooling or by the addition of crushed ice. To this mixture, there is added a solution of 160 parts of ammonium thiocyanate in 400 parts of water, again maintaining the reaction temperature at about 10° C. A solution of 40 parts of sodium hydroxide in 40 parts of water is added to the mixture to neutralize most of the acid and the mixture is stirred for 45 minutes. Then there is added with stirring 1 part of Nekal AEM, an alkyl (less than hexyl) naphthylene sodium sulfonate wetting agent, and 195 grams of aniline in a slow steady stream over about 15 minutes. The temperature of the reaction mixture rises slowly from about 20° C. to about 40° C. during the aniline addition. The temperature is increased to about 65° C. and the product, 2-mercapto - 3 phenyl - 4,6,6 - trimethyl - dihydropyrimidine, crystallizes out. The finely-divided crystals are recovered by filtration, washed and dried. There is recovered 390 parts (an 85% yield) of the product which melts at 186–187° C.

A chemical analysis of this product shows the following percentage composition:

|   | Found | Calculated |
|---|---|---|
|   | Per cent | Per cent |
| C | 67.11 | 67.25 |
| H | 6.98 | 6.90 |
| N | 11.97 | 12.05 |
| S | 13.84 | 13.80 |
|   | 99.90 | 100.00 | thereby confirming the fact that the product is 2 - mercapto - 3 - phenyl - 4,6,6 - trimethyl - dihydropyrimidine. The actual molecular weight of the product as determined by the usual physical chemical procedures is 232, and the calculated molecular weight for this compound is 232.

Example V

To a stirred mixture of 49 parts of mesityl oxide, 51.6 parts of $H_2SO_4$ and 51.6 parts of water, there is added a solution of 40 parts of ammonium thiocyanate in 100 parts of water over a period of 15 minutes. The mixture is stirred for an additional 60 minutes and a quantity of aqueous sodium hydroxide is added until the reaction mixture is almost neutral but still slightly acidic. Then 0.3 part of Nekal AEM and 53.5 parts of o-toluidine are added with stirring. This mixture is heated gradually to 90° C. and the product begins to crystallize out. The crystallization is completed after the reaction mixture stands for an hour or so. There is obtained 95 parts (77% yield) of a product having a melting point of 201–203° C. A chemical analysis of the product indicates that it is 2-mercapto-3-o-tolyl-4,6,6-trimethyl-dihydropyrimidine.

|   | Calculated | Found |
|---|---|---|
|   | Per cent | Per cent |
| C | 68.31 | 68.08 |
| H | 7.31 | 7.30 |
| N | 11.38 | 11.41 |
| S | 13.00 | 13.08 |
|   | 100.00 | 99.87 |

The molecular weight determined by the usual physical chemical methods is found to be 253 whereas the calculated molecular weight is 246.

Example VI

2 - mercapto - 4,6,6 - trimethyl - dihydropyrimidine is prepared by reacting 78.5 parts of 4 - methyl - 4 - thiocyanopentan - 2 - one with concentrated ammonium hydroxide in sufficient quantity to completely react with the thiocyanoketone. The reaction is vigorous with a rapid temperature rise from room temperature to about 80° C. An appreciable excess of ammonium hydroxide is added to compensate for the unreacted ammonia driven off by the heat of the reaction. The desired product settles out almost immediately and is recovered by filtration, and washed and dried in the usual manner. The product is obtained in a 90% yield, and has a melting point of 253° C. The melting point for 2 - mercapto - 4,6,6 - trimethyl - dihydropyrimidine disclosed by Traube in Ber. 27, 279 (1894) is 249° C. This product is accordingly believed to be somewhat more highly purified than that obtained by Traube. The reaction may be represented by the following equation:

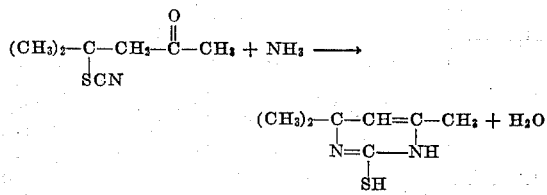

Examples VII to IX

The procedures of Example II is three times repeated using in place of 49.5 parts of cyclohexylamine, the following amines:

|   | Parts |
|---|---|
| Example VII—ethylene diamine | 15 |
| Example VIII—m-phenylene diamine | 27 |
| Example IX—beta-ethanolamine | 30.5 |

Data on the products obtained in these examples are shown in the following table:

| Example | Name | Formula | M. P. °C. | Yield Per Cent |
|---|---|---|---|---|
| VII | ethylene-bis(2-mercapto-4,6,6-trimethyl-dihydropyrimidine-3). | [structure] | 200 | 44 |
| VIII | m-phenylene - bis (2 - mercapto - 4,6,6 - trimethyl-dihydropyrimidine-3). | [structure] | 171–174 | 87 |
| IX | 2-mercapto-3-(beta-hydroxyethyl)-4,6,6-trimethyl-dihydropyrimidine. | [structure] | 186 | 90 |

Examples X to XVI

These examples illustrate the use of beta thiocyano ketones other than 4-methyl-4-thiocyanopentan-2-one in preparing 2-mercaptopyrimidines. In each of these examples isopropylamine is used as a reactant with these other thiocyano ketones in order to simplify the illustrations. It will be understood that ammonia or any of the primary amines hereinabove enumerated can also be used. The reactants used and the products obtained are as follows:

| Example | Beta-Thiocyano Ketone Used | Product |
|---|---|---|
| X | $(C_2H_5)_2$—CH—CH—CH$_2$—C(=O)—CH$_3$<br>\|<br>SCN<br><br>5-ethyl-4-thiocyanoheptan-2-one<br>(From 5-ethyl-3-heptene-2-one + HSCN) | $(C_2H_5)_2$—CH—C—CH=C—CH$_3$<br>\|         \|<br>N=C—N—CH—(CH$_3$)$_2$<br>\|<br>SH<br><br>2-mercapto-3-isopropyl-4-methyl-6(1-ethyl-propyl)-dihydropyrimidine |
| XI | C$_4$H$_9$—CH—CH—CH$_2$—C(=O)—CH$_3$<br>     \|     \|<br>    C$_2$H$_5$  SCN<br><br>5-ethyl-4-thiocyanononan-2-one<br>(From 5-ethyl-3-nonene-2-one + HSCN) |         C$_2$H$_5$<br>C$_4$H$_9$—CH—CH—CH=C—CH$_3$<br>              N=C—N—CH—(CH$_3$)$_2$<br>                  \|<br>                  SH<br><br>2-mercapto-3-isopropyl-4-methyl-6(1-ethyl amyl)-dihydropyrimidine |
| XII | C$_5$H$_{11}$—CH—CH$_2$—C(=O)—CH$_3$<br>      \|<br>     SCN<br><br>4-thiocyano-nonan-2-one<br>(From 3-nonene-2-one + HSCN) | C$_5$H$_{11}$—CH—CH=C—CH$_3$<br>           N=C—N—CH—(CH$_3$)$_2$<br>              \|<br>              SH<br><br>2-mercapto-3-isopropyl-4-methyl-6-amyl-dihydropyrimidine |
| XIII | C$_3$H$_7$—CH—CH$_2$—C(=O)—CH$_3$<br>     \|<br>    SCN<br><br>(4-thiocyano-heptan-2-one from butylidene acetone + HSCN) | C$_3$H$_7$—CH—CH=C—CH$_3$<br>          N=C—N—CH—(CH$_3$)$_2$<br>            \|<br>           SH<br><br>2-mercapto-3-isopropyl-4-methyl-6 propyl-dihydropyrimidine |
| XIV | CH$_2$—CH$_2$—C(=O)—CH$_3$<br>\|<br>SCN<br><br>(4-thiocyano-butan-2-one from vinyl methyl ketone + HSCN) | H$_2$C—CH=C—CH$_3$<br>       N=C—N—CH—(CH$_3$)$_2$<br>          \|<br>         SH<br><br>2-mercapto-3-isopropyl-4-methyl-dihydropyrimidine |
| XV | CH$_2$—CH$_2$—C(=O)—C$_2$H$_5$<br>\|<br>SCN<br><br>5-thiocyano-heptan-3-one<br>(From vinyl ethyl ketone + HSCN) | CH$_2$—CH=C—C$_2$H$_5$<br>      N=C—N—CH—(CH$_3$)$_2$<br>         \|<br>        SH<br><br>2-mercapto-3-isopropyl-4-ethyl-dihydropyrimidine |
| XVI | ⌬—CH—CH$_2$—C(=O)—C$_4$H$_9$<br>    \|<br>  SCN<br><br>(2-phenyl-2-thiocyanoethyl) n-butyl ketone (from styryl n-butyl ketone + HSCN) |       H<br>⌬—C—CH=C—C$_4$H$_9$<br>         N=C—N—CH—(CH$_3$)$_2$<br>           \|<br>          SH<br><br>2-mercapto-3-isopropyl-4-n-butyl-6 phenyl-dihydropyrimidine |

Having disclosed specific examples of my invention which are merely intended to be illustrative of my process and are not to be construed as limitations thereon, I do not desire nor intend to limit myself solely thereto, for it will be apparent to those skilled in the art that the proportions of the materials utilized, and the time and temperature of reaction may be varied and that other materials having equivalent chemical and physical properties may be employed, if desired, without departing from the spirit and scope of my invention as defined in the appended claims.

I claim:

1. A process for the preparation of 2-mercapto-dihydropyrimidines which comprises reacting a beta-thiocyano-ketone with a member of the class consisting of ammonia and primary amines and recovering the resulting 2-mercapto-dihydropyrimidine.

2. A process for the preparation of 3-hydrocarbon substituted 2-mercapto-dihydropyrimidines which comprises reacting a beta-thiocyano-ketone with a primary amine and recovering the resulting 2-mercapto-dihydropyrimidine.

3. A process for preparing 3-hydrocarbon substituted 2-mercapto-4,6,6-trimethyl-dihydropyrimidines which comprises reacting 4-methyl-4-thiocyanopentan-2-one with a primary monoamine and recovering the resulting 2-mercapto-dihydropyrimidine.

4. A process as defined in claim 3 wherein the primary monoamine is an alkylamine.

5. A process as defined in claim 3 wherein the primary monoamine is cyclohexylamine.

6. A process as defined in claim 3 wherein the primary monoamine is aniline.

7. A composition of matter comprising 2-mercapto - 3 - cyclohexyl-4,6,6-trimethyl-dihydropyrimidine.

8. A composition of matter comprising 2-mercapto-3-isopropyl - 4,6,6 - trimethyl-dihydropyrimidine.

9. A composition of matter comprising a 2-mercapto 3-substituted dihydropyrimidine having the formula:

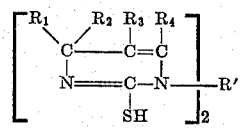

where $R_1$, $R_2$ and $R_3$ are selected from the group consisting of hydrogen and monovalent hydrocarbon radicals, $R_4$ is a monovalent hydrocarbon radical and $R'$ is a bivalent hydrocarbon radical.

10. A composition of matter comprising ethylene-bis(2-mercapto-4,6,6 - trimethyl dihydropyrimidine-3).

FRANK SWEDISH, Jr.

REFERENCES CITED

The following references are of record in the file of this patent:

UNITED STATES PATENTS

| Number | Name | Date |
|---|---|---|
| 2,132,790 | Ter Horst | Oct. 4, 1938 |